Figure 2:
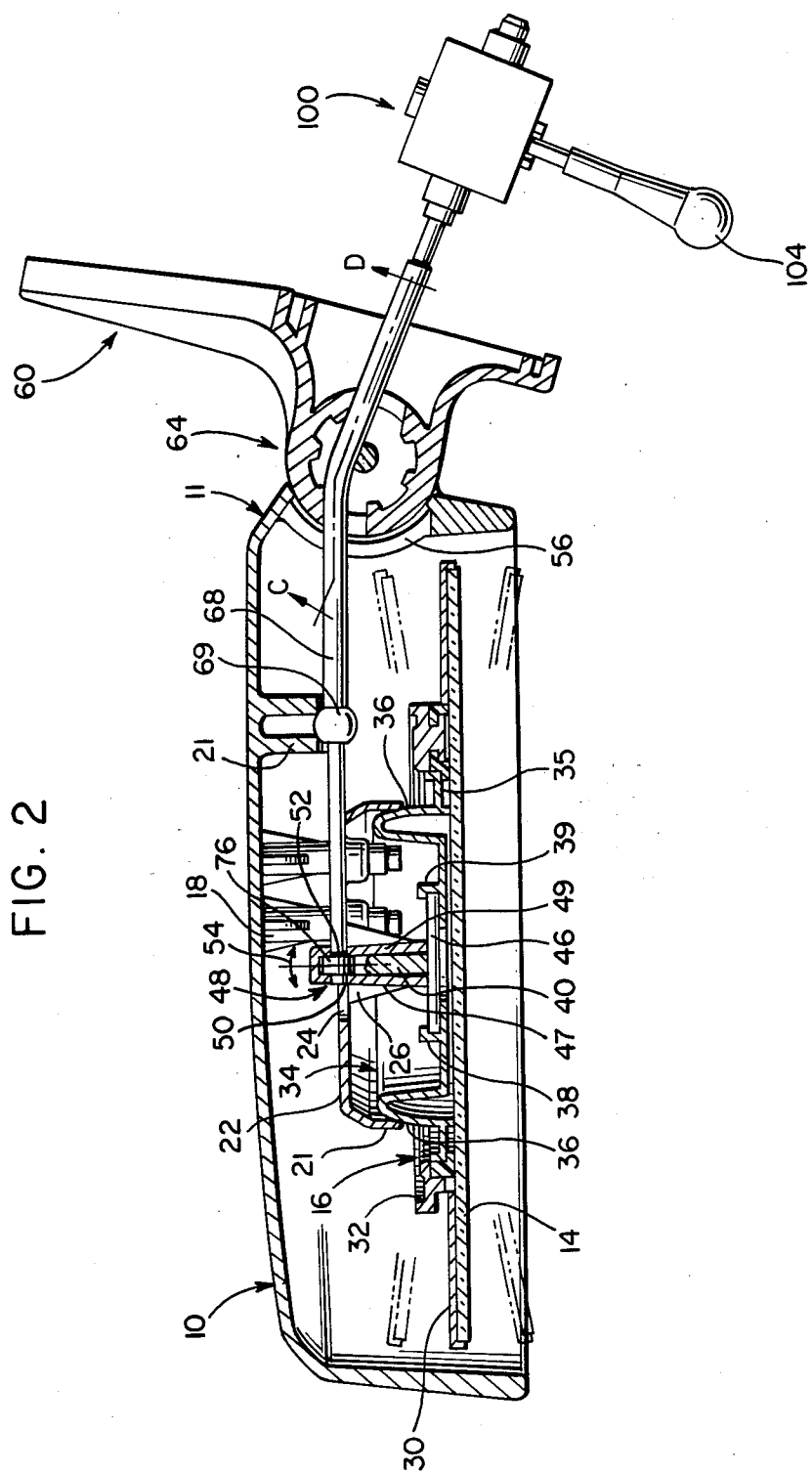

United States Patent [19]

Gillet

[11] Patent Number: 4,889,308

[45] Date of Patent: Dec. 26, 1989

[54] OUTSIDE REAR-VIEW MIRROR HAVING A MECHANICALLY ADJUSTABLE MIRROR GLASS

[75] Inventor: Jean-Luc Gillet, Collenberg, Fed. Rep. of Germany

[73] Assignee: Hohe KG, Collenberg, Fed. Rep. of Germany

[21] Appl. No.: 119,767

[22] Filed: Nov. 12, 1987

[51] Int. Cl.⁴ .............................................. B60R 1/06
[52] U.S. Cl. ................................... 248/485; 248/487; 74/502.1
[58] Field of Search ................ 248/479, 480, 485–487, 248/284, 291; 74/502.1; 350/632–634, 636, 604

[56] References Cited

U.S. PATENT DOCUMENTS

| | | | |
|---|---|---|---|
| 3,251,238 | 5/1966 | Fuqua | 74/501 |
| 3,370,479 | 2/1968 | Van Noord | 74/502.1 |
| 3,390,588 | 7/1968 | Savage | 74/501 |
| 3,747,429 | 7/1973 | Cass | 74/492 |
| 4,388,840 | 6/1983 | Manzoni | 74/502.1 |
| 4,577,823 | 3/1986 | Manzoni | 248/485 X |

FOREIGN PATENT DOCUMENTS

| | | |
|---|---|---|
| 019501 | 4/1980 | European Pat. Off. . |
| 7529248 | 2/1976 | Fed. Rep. of Germany . |
| 2907433 | 9/1980 | Fed. Rep. of Germany . |
| 7806907 | 4/1981 | Fed. Rep. of Germany . |
| 2391629 | 12/1978 | France . |
| 2512759 | 3/1983 | France ............................... 74/502.1 |
| WO83/01986 | 6/1983 | World Int. Prop. O. . |

Primary Examiner—Alvin C. Chin-Shue
Attorney, Agent, or Firm—Fleit, Jacobson, Cohn, Price, Holman & Stern

[57] ABSTRACT

An outside rear-view mirror for a vehicle has a pedestal and a mirror housing which is swingably mounted to the pedestal. A mirror glass is bonded to a backing element which is mounted to a universal joint including a rocker and being fastened to the base of the mirror housing. A handle is adapted to be mounted within the interior of the vehicle and to be manipulated in either of two transverse directions. One end of a flexible shaft is hung into a shackle projecting from the backing element transversely to the mirror glass and having a pinion which may rotate with the shaft and engage a toothed segment of the rocker. The second end of the shaft is coupled to a gear which engages a toothed rack coupled to the handle so as to be displaceable longitudinally upon manipulation of the handle.

8 Claims, 4 Drawing Sheets

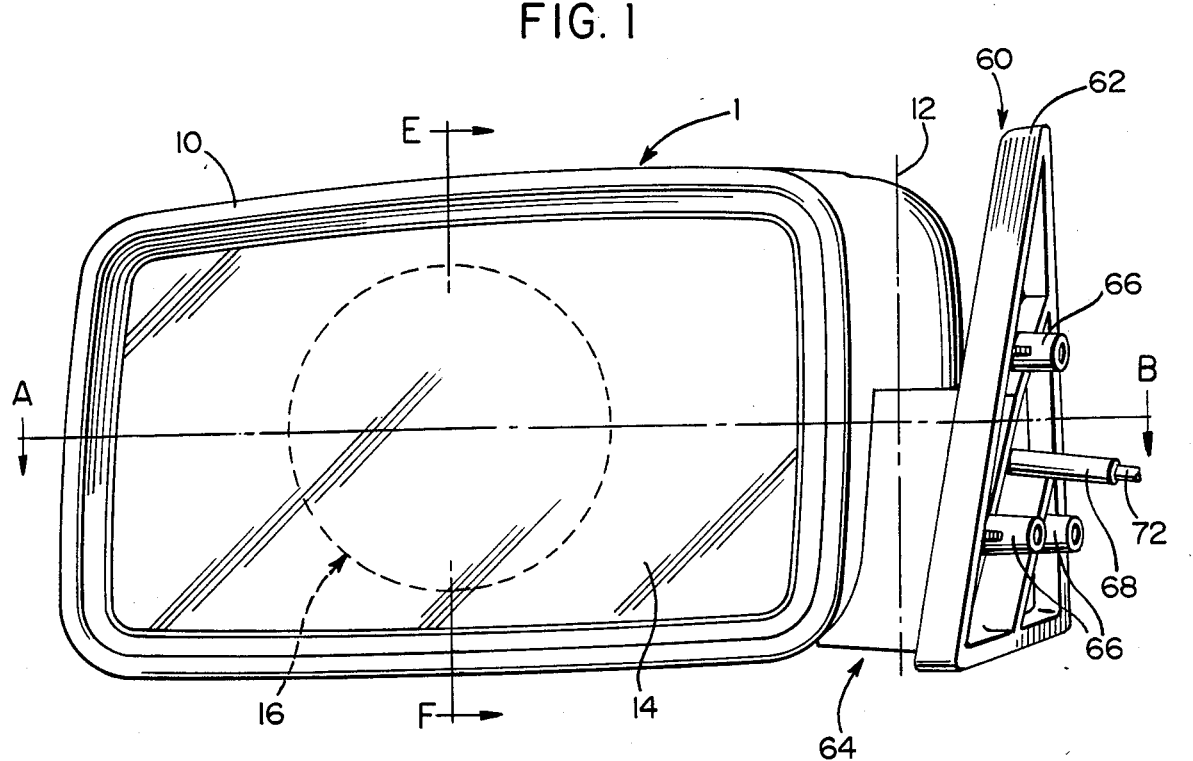
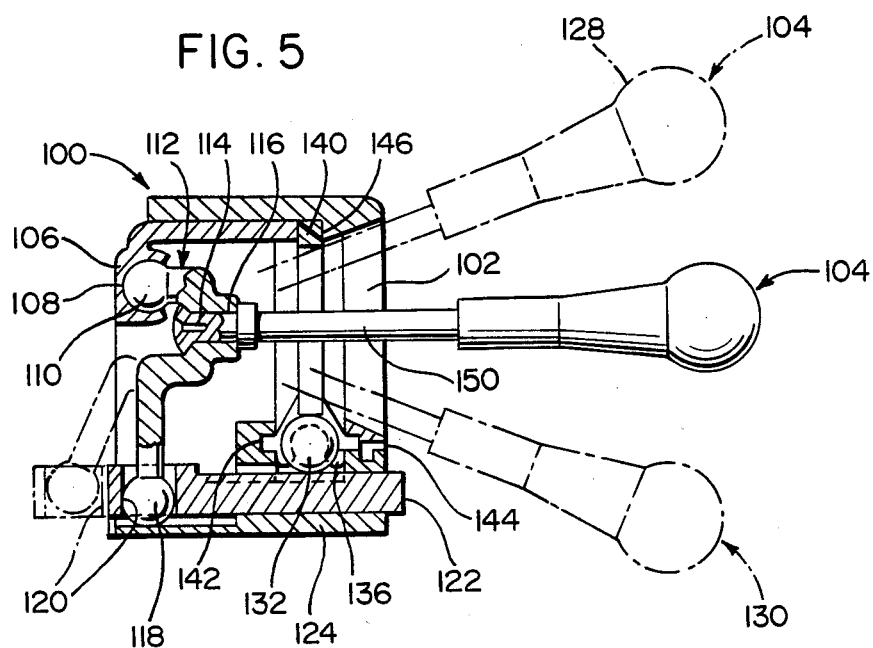

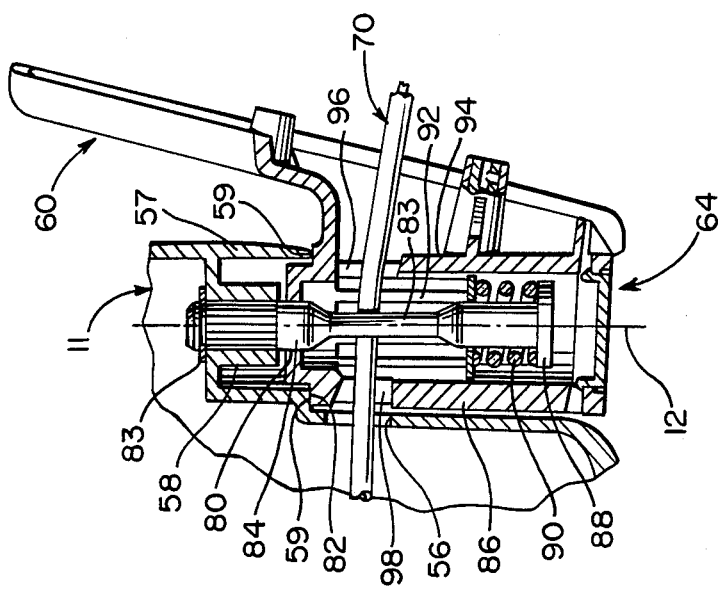
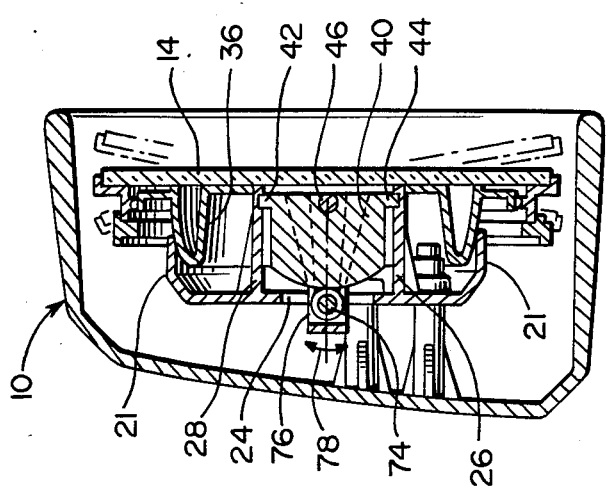

OUTSIDE REAR-VIEW MIRROR HAVING A MECHANICALLY ADJUSTABLE MIRROR GLASS

The invention relates to an outside rear-view mirror which has a pedestal and a mirror housing which is swingably mounted to the pedestal adapted to be fastened to a car body. A mirror glass is bonded to a backing element which is mounted to a universal joint including a rocker and being fastened to a base of the mirror housing. A handle is adpated to be positioned within the interior of the vehicle, preferably close to the driver's door. The handle may be manipulated manually in either of two transverse directions.

German utility model specification No. 78 06 907 discloses an outside rear-view for a car, the mirror glass of which may be adjusted by pivoting it about anyone or both of two perpendicular axes, one of which is normally upright and the other of which runs transversely to the car body to which the pedestal is fastened. In the mirror housing a tilting bar is provided with two opposite pins, each being supporting within a bracket fastened to the base of the mirror housing, and is provided with two further pins extending from the bar transversely to the first pair of pins and supported within a member fastened to the mirror glass. Bowden cables are hung into the member and extend through the mirror housing and a pedestal of the outside rear-view mirror to which the mirror housing is rockably mounted. The ends of the Bowden cables adjacent the pedestal are connected to a transmission device for transferring a manualy caused displacement of a handle into push and/or pull of the Bowden cables. Thus, the position of the mirror glass may be adjusted as desired by a manipulation of the handle which is transferred into a pivoting movement of the mirror glass about said axes.

The known adjustment device for the mirror glass of an outside rear-view mirror for a car is of complex and stiff structure because the Bowden cables are substantially bent along their extension through the pedestal and the hinge connecting the mirror housing to the pedestal.

It is therefore an object of the invention to provide an improved outside rear-view mirror, the mirror glass of which may be adjusted more easily by corresponding manipulation of the handle in the interior of the car. It is a further object of the invention to devise a simple adjustment means of high reliability and extended life time. Moreover, the structure of the adjustment means should preferably not be affected by any rocking movement of the mirror housing.

According to the invention, an outside rear-view mirror for a vehicle has a mirror housing which is swingably mounted to a pedestal adapted to be fastened to the car body. A mirror glass is bonded to a backing element which is mounted to a universal joint including a rocker and being fastened to a base of the mirror housing. A handle is adapted to be mounted within the interior of the vehicle and to be manipulated in either of two transverse directions. One end of a flexible shaft is hung into the rocker projecting from the backing element transversely to the mirror glass and has a pinion which may rotate with the shaft and engage a toothed segment of the rocker. The second end of the shaft is coupled to a gear which engages a toothed rack coupled to the handle so as to be displaceable longitudinally upon manipulation of the handle. The flexible shaft may easily extend through the hinge connecting the mirror housing to the pedestal and allows an easy adjustment ot the mirror glass without substantial friction. Moreover, the assembly of the adjustment device requires less time and effort than adjustment devices of known structure.

According to a preferred embodiment of the invention, the flexible shaft is surrounded by a firm and flexible jacket connected to the mirror housing and extending at least through the pedestal. The jacket ensures that the shaft is properly guided along its extension when transmitting push and pull and rotational movements from the handle to the mirror glass. Placing of the shaft within the pedestal and the adjacent portions of the mirror housing is simplified by an improvement of the invention according to which the mirror housing is swingably or rockably mounted to the pedestal by a bolt which the shaft may pass and extend through openings provided for within the pedestal and the mirror housing. A cylindric cage may be provided through which the bolt extends axially and which the opposite openings for passing the shaft therethrough. The opening adjacent the mirror housing may be formed as a circumferential slot for accommodating the movements of the shaft when the mirror housing is rocking. As an alternative, the opening within the mirror housing close to the pedestal may be made as a transverse slot in order to leave sufficient space for the shaft during rocking.

For transferring the manipulation of the handle to corresponding reactions of the shaft, the handle is mounted according to a further aspect of the invention to a swivelling lever coupled to the rack. Thereby turning of the handle in one direction is transferred into a rotation of the shaft. Turning the handle in the transverse direction is transferred into longitudinal displacement of the gear when, according to yet another aspect of the invention the handle extends through a plate which may be displaced transversely to the rack and is coupled to the gear.

The portion of the adjustment device which is close to the mirror glass comprises according to a preferred implementation of the invention a support of the toothed segment on stands mounted to the mirror housing, and a bar which intersects transversely the segment and has opposite pins extending rotatably into projections from the support. A shackle may embrace laterally the toothed segment between the stands and a pinion may be fixed to the arms of the shackle below the segment.

According to yet another preferred embodiment of the invention, the rack engages the gear from the below and the shackle may be supported pivotably about a longitudinal axis of the rear-view mirror which runs substantially horizontally when the rear-view mirror is fastened to the vehicle. In this embodiment of the invention, an up and down displacement of the handle leads to an up and down adjustment of the position of the mirror glass, and a lateral displacement of the handle results in a corresponding lateral adjustment of the position of the mirror glass.

Figure 6:
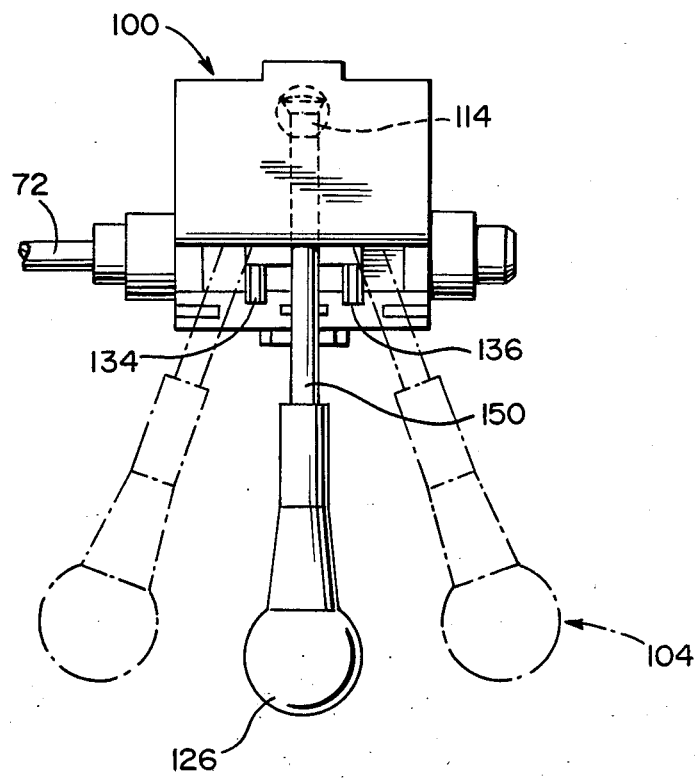
Figure 7:
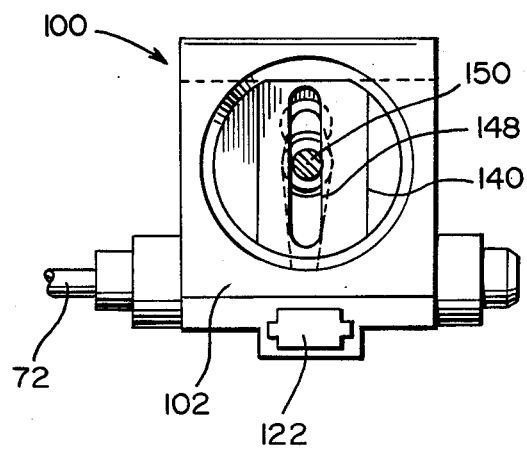

The above as well as other objects and advantages and characteristics of the present invention will become apparent from the following description of a preferred embodiment thereof with reference to the accompanying drawings, of which show:

FIG. 1: a perspective view of the rear side of an outside rear-view mirror adapted to be fastened to the driver's door;

FIG. 2: a cross-sectional view of the rear-view mirror according to FIG. 1 along the line A-B;

FIG. 3: a cross-sectional view of the rear-view mirror according to FIG. 1 along the line E-F;

FIG. 4: a cross-sectional view according to FIG. 1 along the line C-D of FIG. 2;

FIG. 5: a schematic representation of a handle and of a cross section of a control casing therefore, different positions of the handle being shown;

FIG. 6: a schematic representation of the handle with control casing in plan view according to FIG. 5;

FIG. 7: an end view of the control casing according to Fig. 5 from which the handle is removed.

The outside rear-view mirror 1 comprises a mirror housing 10 and a pedestal 60 to which the mirror housing is mounted so as to be rockable about an axis 12. A mirror glass 14 is supported by the mirror housing 10 and may be adjusted about two perpendicular axes. To this end the mirror glass 14 is mounted to the backing member 30 forming part of the structure 16 for detachably holding the mirror glass.

The pedestal 60 includes a mounting plate 62 and a bearing section 64 projecting laterally from the mounting plate 62. The mounting plate is provided, opposite to the bearing section 64, with mounting studs 66 which allow fastening of the rear-view mirror to the front triangle of the left-hand driver'door of a car. A shaft 70 surrounded by a firm and flexible jacket 68 projects outwardly from the mounting plate 62. The end 72 of the shaft 70 projecting from the jacket 68 is adapted to be coupled to a control casing 100 specifically shown in FIGS. 5, 6, 7 and mounted in the interior of the car, not shown.

According to FIG. 2, two posts 18, 20 project inwardly from a base of the mirror housing 10 to which a cup 22 is fixed. The cup 22 has a central break-through 24 and two upright opposing stands 26, 28 which extend higher above the rim 21 of the cup 22 and are provided on either side of the break-through 24. Close to the free end each stand 26, 28 has two aligned bearing holes, not shown.

The mirror glass support 16 specific comprises a backing plate 30 bonded to the rear surface of mirror glass 14 and detachably connected to a reverted pot 34 by means of a mounting ring 32 as disclosed in detail in German Patent specification No. 29 07 433. The pot 34 is formed with a peripheral skirt 36. The edge of rim 21 abuts the peripheral wall of skirt 36 in all adjustment positions of the mirror glass 14 for reducing vibrations as specifically disclosed in German utility model specification No. 78 06 907. As can be seen from FIG. 2, skirt 36 plunges to this end into the interior of cup 22. In view of the clamping ring 32 the mirror glass 14 is mounted to the pot 34.

Two opposing projections 38, 39 are formed from the base of pot 34 into which aligned bores are drilled. The common center line of said bores within the projection 38, 39 runs perpendicular to the center line of the bearing holes which are as explained above driven into the free ends of stands 26, 28. Moreover, the common center line of the bores within the projections 28, 29 runs parallel to the longitudinal axis AB of the mirror housing 10 which extends substantially horizontally when the rear-view mirror 1 is fastened to a car body, not shown.

A substantially rectangular toothed segment 40 is provided, adjacent to the mirror glass 14, with two opposite journals 42, 44 extending parallel to the surface of the mirror glass 14 and rotatably accommodated within the holes of stands 26, 28. Moreover, adjacent the mirror glass 14 a rod 46 intersects the segment 40 unrotatably. The opposite ends of rod 46 are rotatably accommodated within the bores of projections 38, 39. Thus, the stands 26, 28 and the projections 38, 39 and the segment 40 with rod 46 form a universal joint which allows the mirror glass 14 to pivot about one or both of the center lines of the holes within stands 26, 28 and bores within projections 38, 39 relative to the cup 22 fixed to the mirror housing. So an adjustment of mirror glass 14 may be effected for example by pressing manually on the outside of the mirror glass 14 outside the center thereof. The range of pivoting movement of the mirror glass 14 relative to the mirror housing 10 about an axis perpendicular to the drawing plane of FIG. 2 is illustrated by the phantom lines of the end portions of the mirror glass 14 in FIG. 2. When the mirror glass 14 is adjusted within this range, the segment 40 swings correspondingly about said axis.

For adjusting the mirror glass 14 by manipulating a handle provided for in the interior of the car, the adjustment device is further described as follows.

Firstly it is to be noted that the edge of segment 40 opposite to the mirror glass 14 is formed like an arc and with teeth not shown specifically in Fig. 3. Moreover, a shackle 48 raises from the base of pot 34 and extends through the break-through 24 of cup 22. The legs 47, 49 of shackle 48 embrace the segment 40 so as to remain pivotable about the center line of the bores of projections 38, 39. Portions of the legs 47, 49 which extend beyond the free edge of the segment 40 are each provided with aligned bearings 50, 52 for rotatably supporting an end portion 74 of the flexible shaft 70. A pinion 76 is fixedly mounted to, for instance soldered on the end portion 74 between the legs 47, 49 which engages some of the teeth of segment 40 (FIG. 2). In the event the flexible 70 shaft rotates, the pinion 76 follows such rotation and runs along the teeth of resting segment 40 according to the arrow 78 in FIG. 3. Considering the pivotable support of rod 46 in projections 38, 39, it may be understood that rotation of shaft 70 leads to an up or down adjustment of mirror glass 14 within the range as indicated by the phantom lines in FIG. 3.

On the other hand, a longitudinal displacement of shaft 70, in view of the pinion 76 being caught within the shackle 48, leads to a pivoting movement of shackle 48 according to arrow 54 in FIG. 2. Thus, the mirror glass 14 may be adjusted within the range as illustrated in FIG. 2.

The end 69 of jacket 68 is fixed to a post 21 projecting inwardly from the base of the mirror housing 10 between cup 22 and the portion 11 of the mirror housing close to the pedestal such that the end portion 74 projecting from the jacket 68 may follow the movements of pinion 76. The flexible shaft 70 extends through the jacket 68 so as to be rotatable and longitudinally displaceable therein.

The portion 11 of the mirror housing 10 is provided with a bushing 58 which is aligned to a bearing 80 of bearing section 64 when the mirror housing 10 is mounted to the pedestal 60. The bushing 58 is surrounded in spaced relationship by a shield 57, the lower edge 59 of which abuts a ring shoulder 82 of bearing section 64 and rides thereon when the mirror housing 10 is rocking relative to the pedestal 60. The ring shoulder 82 is axial bearing surface of the pedestal 60 for the mirror housing 10.

A bolt 84 is pressfit into bushing 58 and the radially extended head 83 of bolt 84 abuts the mirror housing around bushing 58. The bolt 84 extends through the bore 80 into a strong cylindric cage 86 formed from the bearing section 64. A ring flange 88 is provided at the end of bolt 84 opposite to its head 83. Between ring flange 88 and an inwardly projecting ring shoulder of cage 86 a spiral pressure spring 90 is held which ensures a strong mounting of the mirror housing 10 to the pedestal 60 and allows rocking of the mirror housing in case of impact thereon from the front or from the rear. As will be seen from FIG. 4, the axis 12 of bolt 84 coincides with the axis of the cage 86 and is simultaneously the rock axis for the mirror housing 10.

Cage 86 is provided with longitudinal enforcing rips 92 formed from its circumferential wall 94. A first opening 96 in the vicinity of the mounting plate 62 and a second opening 98 opposite to the first one are formed as a circumferential slot within the circumferential wall 94 of cage 86. Thereby, as shown in FIG. 4, the flexible shaft 70 together with its jacket 68 may pass through an opening 56 in the mirror housing 10, and may pass through slot 98, and may pass an intermediate contracted section 83 of bolt 84 and may extend to the first opening 86 for emerging from pedestal 60 into the interior of a car to which pedestal 60 is fastened. As the flexible shaft 70 extends close to the rock axis 12, a rocking movement of mirror housing 10 does practically not effect the adjustment of mirror glass 14.

The control casing 100 shown in FIGS. 5-7 is adapted to be fastened in a manner not shown within the interior of the car adjacent the mounting plate of pedestal 60. Thus, a handle 104 may project from a front wall 102 of the control casing 100 for convenient manual manipulation thereof. The control casing 100 has a rear wall 106 from which a spherical socket 108 open to the interior of the control casing is formed and accommodates ball 110 of a lever arm 112. The inner end 114 of the handle 104 is mounted within a bore 116 of the lever arm 112, the bore being provided at the lever arm 112 below ball 110. The end 118 of the lever arm 112 opposite to the ball 110 engages a recess 120 of a toothed rack 122 which is longitudinally displaceable within a longitudinal groove formed in the base plate 124 of the control casing 100. Said groove extends parallel to a middle position 126 of the handle 104 in a plan view of the control casing 100 according to FIG. 6. Thus, the rack 112 may be shifted from a front position to a backward position by manipulating the handle 104 from the uppermost position 128 thereof to the lowermost position 130 thereof as shown in FIG. 5. The rack 122 is formed on its upper side with teeth into which a gear 132 engages. The gear 132 is fixed on the second end 72 of the flexible shaft 70. Thus, manipulation of the handle as explained above and shown in FIG. 5 is transferred through a longitudinal displacement of the rack 122 into a rotation of the flexible shaft 70. As the rack engages the gear 132 from below, an upward manipulation of the handle 104 is transferred into an upward adjustment of the mirror glass 14 and a downward manipulation of handle 104 is transferred into a downward adjustment of mirror glass 14 about the length axis AB thereof.

The gear 132 has two axially spaced circumferential grooves, into each of which a fork 134, 136 of a plate 140 is inserted so as to allow the gear to rotate under control of the rack. However, if the plate 140 is shifted laterally, i.e. axially with respect to the gear, said gear gripped by the forks 134, 136 will follow such translational movement of the plate 140. The plate 140 is guided within two lower opposite grooves 142, 144 formed from the front wall 103, and is guided within an upper groove 146 formed from the front wall 102 so as to be axially displaceable with respect to the gear 132. A more central portion of the plate 140 is left open in form of a longitudinal slot 148 extending transversely to the translational motion of the plate 140. The stem 150 of the handle 104 mounted in the bore 116 extends through the longitudinal slot 148. Therefore, the gear 132 which has a sufficient axial extension may be displaced laterally between the teeth of the rack 122 when the handle 104 is displaced laterally i.e. transversely to the longitudinal direction of slot 148 according to FIG. 6 without inducing a rotation of the flexible shaft 70. Thereby displacement of the handle to the left is transferred to an adjustment of the mirror glass 14 to the left and a displacement of the handle 104 to the right is transferred into an adjustment to the right of the mirror glass 14 about the vertical axis EF thereof.

The control casing 100 as explained above brings about the advantage that screwing or revetting of parts is obviated. The control casing 100 comprises only simple plug-in plastic parts. Moreover, the translation of the manual manipulation of the handle 104 into corresponding reactions of the flexible shaft 70 is made easy and without any invonvenience.

While a preferred embodiment of the invention has been illustrated and described, it will be understood that various changes and modifications may be made without departing from the spirit of the invention.

What is claimed is:

1. Outside rear-view mirror for a vehicle having a pedestal and a mirror housing which is swingably mounted to the pedestal, a backing member for a mirror glass being mounted to a universal joint including a rocker and being fastened to a base of the mirror housing, a handle adapted to be mounted within the interior of the vehicle and manipulatable in one or both of two transverse directions, and an adjustment device for adjusting the position of the mirror glass in response to a manipulation of the handle, said adjustment device including a flexible shaft, a first end of which is hung into the rocker projecting from the backing member transversely to the mirror glass and including a pinion engaging a toothed segment of the rocker, and a second end of which is fixedly coupled to a gear engaging a toothed rack which may be displaced longitudinally upon manipulating the handle, the toothed segment being supported on stands mounted to the mirror housing, and a rod intersecting transversely a segment which is journalled rotatably into aligned holes of projections from the backing element so as to form said universal joint, the rocker being formed as a shackle embracing laterally the toothed segment between the stands, the pinion being held rotatably by arms of said shackle.

2. Outside rear-view mirror according to claim 1 wherein the shaft is surrounded by a firm and flexible jacket mounted to the mirror housing and extending through the pedestal and through a hinge which connects the mirror housing to the pedestal.

3. Outside rear-view mirror according to claim 1 wherein the mirror housing is mounted to the pedestal so as to be able to swing about a bearing bolt, the shaft passing the bolt and extending through an opening of the mirror housing and an opening of the pedestal.

4. Outside rear-view mirror according to claim 3 wherein the pedestal is provided with a cylindric cage through which the bearing bolt extends axially and wherein two opposite openings are provided through which the shaft extends.

5. Outside rear-view mirror according to claim 4 wherein the opening of the cage adjacent the mirror housing is formed by a slot.

6. Outside rear-view mirror according to claim 1 wherein the handle is mounted to a swivelling lever coupled to the rack and held pivotably within a casing.

7. Outside rear-view mirror according to claim 6 wherein the handle extends through a plate which may be displaced transversely to the rack and is coupled to the gear so as to allow the gear to rotate under control of the swivelling lever.

8. Outside rear-view mirror according to claim 1 wherein the rack engages the gear from below and wherein the rocker is mounted so as to be able to pivot about the longitudinal axis of the mirror glass which extends substantially horizontally after the rear-view mirror has been fastened to the vehicle.

* * * * *